(12) United States Patent
Ludlaim et al.

(10) Patent No.: US 12,209,808 B2
(45) Date of Patent: Jan. 28, 2025

(54) PASSIVE WATER COOLER

(71) Applicants: HUGHES SAFETY SHOWERS LIMITED, Stockport (GB); CELANT-TEL S.R.L. LLC, Vimercate (IT)

(72) Inventors: Alan Ludlaim, Stockport (GB); Kiran Damji, Stockport (GB); Enzo Celant, Vimercate (IT); Matteo Aldo Torregiani, Vimercate (IT)

(73) Assignees: HUGHES SAFETY SHOWERS LIMITED, Stockport (GB); CELANT-TEL S.R.L. LLC, Vimercate (IT)

(*) Notice: Subject to any disclaimer, the term of this patent is extended or adjusted under 35 U.S.C. 154(b) by 421 days.

(21) Appl. No.: 17/279,791

(22) PCT Filed: Sep. 24, 2019

(86) PCT No.: PCT/GB2019/052678
§ 371 (c)(1),
(2) Date: Mar. 25, 2021

(87) PCT Pub. No.: WO2020/065290
PCT Pub. Date: Apr. 2, 2020

(65) Prior Publication Data
US 2021/0341230 A1    Nov. 4, 2021

(30) Foreign Application Priority Data
Sep. 25, 2018 (GB) .................................. 1815626

(51) Int. Cl.
*F28D 20/00* (2006.01)
*A61H 35/02* (2006.01)
*A47K 3/28* (2006.01)

(52) U.S. Cl.
CPC ......... *F28D 20/0034* (2013.01); *A61H 35/02* (2013.01); *A47K 3/286* (2013.01);
(Continued)

(58) Field of Classification Search
CPC ........ F28D 1/02; F28D 1/0213; F28D 1/0246; F28D 1/0266; F28D 1/06; F28D 15/00;
(Continued)

(56) References Cited

U.S. PATENT DOCUMENTS 2,499,736 A * 3/1950 Kleen ..................... F25D 3/005
62/119
4,280,333 A * 7/1981 Corliss .................. F24D 11/003
165/53

(Continued)

FOREIGN PATENT DOCUMENTS

DE   102016013078 A1   5/2018
WO      2017100693 A1   6/2017

OTHER PUBLICATIONS

Carsten Birch, "Tepid Water Requirements for Emergency Equipment", Jul. 1, 2008, https://www.safetyandhealthmagazine.com/articles/tepid-water-requirements-for-emergency-equipment-2, p. 2 (Year: 2008).*

(Continued)

*Primary Examiner* — Raheena R Malik
(74) *Attorney, Agent, or Firm* — Hoffman Warnick LLC

(57) ABSTRACT

A passive water cooler comprising a water tank arranged for containing a volume of water, an internal heat exchanger disposed within the water tank for contact with (e.g. submersion within) said volume of water and an external heat exchanger disposed outside the water tank in thermal communication with the internal heat exchanger. The external heat exchanger and the internal heat exchanger are connected and arranged to collectively define a fluid circulation circuit configured to contain coolant fluid flowable by convection to provide said thermal communication for transferring heat therebetween. The tank comprises thermally insulating material for thermally insulating said volume of water from the environment within which the external heat (Continued)

exchanger resides. The external heat exchanger is arranged to be positioned higher than the internal heat exchanger to permit formation of a thermocline within the coolant fluid between the external heat exchanger and the internal heat exchanger.

17 Claims, 15 Drawing Sheets

(52) U.S. Cl.
    CPC .............. *A61H 2201/0214* (2013.01); *A61H 2201/0264* (2013.01); *F28D 2020/0078* (2013.01)

(58) Field of Classification Search
    CPC .. F28D 20/00; F28D 20/0034; F28D 20/0039; F28D 2020/0065; F28F 2265/10; A47K 3/286; H05K 7/203
    See application file for complete search history.

(56) References Cited

U.S. PATENT DOCUMENTS

| 4,293,030 | A | * | 10/1981 | Rambach | ................ F28D 15/00 165/104.32 |
| 4,907,644 | A | | 3/1990 | Ghiraldi | |
| 6,711,758 | B1 | * | 3/2004 | Terek | ..................... A61H 35/02 4/620 |
| 11,802,738 | B2 | * | 10/2023 | Tiwari | ................ F28D 15/0266 |
| 2007/0028626 | A1 | * | 2/2007 | Chen | ....................... F25B 25/00 165/104.21 |
| 2011/0289951 | A1 | * | 12/2011 | Furlong | ................ F24F 5/0035 29/890.035 |
| 2012/0227730 | A1 | * | 9/2012 | Teoh | ....................... F24S 60/30 62/310 |
| 2013/0312937 | A1 | * | 11/2013 | Tsukinari | ............... A61H 35/02 4/597 |
| 2014/0150175 | A1 | * | 6/2014 | Hekster | ................. A61H 35/02 4/597 |
| 2017/0035255 | A1 | | 2/2017 | Eveleigh et al. | |

OTHER PUBLICATIONS

Ron George, "Emergency Showers and Eye/Face Wash Equipment, Part 1", Jul. 26, 2017, https://www.phcppros.com/articles/5639-emergency-showers-and-eyeface-wash-equipment-part-i, p. 5 (Year: 2017).*

PCT International Search Report and Written Opinion for International Application No. PCT/GB2019/052678, dated Dec. 17, 2019, 8 pages.

* cited by examiner

PASSIVE WATER COOLER

FIELD

The invention relates to water cooling apparatus and methods. In particular the invention relates to passive water cooling, e.g. requiring no man-made input power. Particular applications include the cooling of a water supply for an emergency shower unit and/or eyewash unit.

BACKGROUND

Remote industrial facilities, such as remote oil wells/rigs or remote power distribution facilities, require routine and periodic manual inspection and maintenance. These facilities may be located in very remote locations, such as deserts or tropical terrains, which have no supply of mains water. Personnel, when visiting such remote facilities, may find themselves in situations where there is a risk of exposure to harmful chemicals or materials. These could include chemicals used in (or created by) the industrial process performed by the remote facility, or chemicals and materials used in a routine maintenance operation (e.g. cleaning fluids etc.). In the event of unexpected and accidental exposure to such materials, personnel should preferably quickly wash the materials from themselves to cleanse themselves of the contaminant thereby reducing the ill effects that could flow from exposure to them. This could include washing the contaminant from the skin, hair and/or eyes.

The provision of clean (potable), safe water for use in washing contaminant chemicals or other materials from the body or eyes of maintenance or inspection personnel in an emergency, is not only highly desirable for the safety of personnel, but can also be a basic legal requirement. However, the water used for this purpose should be clean (potable) and of a suitable temperature. If the water is too cold or too hot, it may damage the skin or eyes or cause sufficient discomfort that personnel find it difficult to fully and thoroughly wash/decontaminate themselves using the water. In locations that have high ambient temperatures such as in Africa and the Middle East, the water in a safety shower may become overheated in the mains water supply or in a non-chilled water tank, through exposure to solar radiation. This can result in the possibility of scalding to the user upon operation or aggravation of the injury when a person uses a safety shower.

Emergency shower units and eye-wash units are provided in industrial facilities supplied by a mains water supply and mains electricity, allowing careful water temperature control electrically. However, remote facilities do not have this luxury. The present invention aims to address this.

The present invention also aims to address the provision of emergency showers in non-remote locations too, which may also require water at safe temperatures without the need to rely on a power supply (e.g. mains electricity) for that provision. An example would be chemical plants and oil refineries that do have power and water supplies, but which can benefit from provision of an emergency shower system that does not depend on those supplies directly. An existing solution, in hot climates, for the provision of tepid water is a water tank fitted with an electrical chiller unit system that constantly circulates water through the chiller system, and when the water temperature starts to rise the chiller system may switch on to keep the water within the safe limits. However, such chillers need electricity and require maintenance to run properly. Some locations do not have access to a reliable power source or cannot guarantee 'tepid' water temperatures suitable to supply emergency safety showers. The present invention aims to address this.

SUMMARY

In a first aspect, the invention provides a passive water cooler comprising a water tank arranged for containing a volume of water (e.g. water to be cooled), an internal heat exchanger disposed within the water tank for contact with (e.g. partial or full submersion within) said volume of water (e.g. for extracting heat from the water to be cooled), and an external heat exchanger disposed outside the water tank in thermal communication with the internal heat exchanger (e.g. for dissipating heat extracted from the water by the internal heat exchanger). The external heat exchanger and the internal heat exchanger are arranged in fluid communication in a mutual fluid circulation circuit configured to contain coolant fluid flowable therein by convection to provide said thermal communication for transferring heat (e.g. transferring heat between them). The tank comprises thermally insulating material for thermally insulating the volume of water from the environment within which the external heat exchanger resides. The external heat exchanger is arranged to be positioned higher than (e.g. at a higher level/altitude, above, or over) the internal heat exchanger to permit formation of a thermocline within the coolant fluid between the external heat exchanger and the internal heat exchanger. The external heat exchanger and the internal heat exchanger may be connected and arranged to collectively define a fluid circulation circuit (or respective parts of it). Heat transfer may thereby take place using the coolant fluid by the circulation of currents of the coolant fluid from one region of the fluid circulation circuit to another. This may be referred to as convection flow. The manner in which the internal heat exchanger is disposed within the water tank, may take several forms. For example, the internal heat exchanger may be disposed within the water tank so as to be within the space/cavity/volume defined by the water tank for holding water, thereby being surrounded by walls (e.g. inner floor, walls, and/or ceiling) of the water tank. Alternatively, the internal heat exchanger may be disposed within the water tank so as to form a part of an inner surface (e.g. defining or integrated with a wall, and/or floor and/or ceiling) of the structure defining the space/cavity/volume defined by the water tank for holding water.

A thermocline is a layer in a body of water that sharply separates regions differing in temperature, so that the temperature (spatial) gradient across the layer is abrupt. The temperature (spatial) gradient is greater than that of the warmer water above the thermocline and is greater than that of the colder water below the thermocline.

Convection flow takes place due to the temperature difference between the external exchanger coolant temperature (close to the environmental/ambient temperature) and the internal exchanger coolant temperature (close to the water tank temperature). This difference of temperature leads to a difference of density of the coolant of the cooling system. The difference of density leads to the coolant movement. The coolant movement enables the circulation and the heat transfer. The body of coolant fluid within the fluid circulation circuit is most preferably a continuous body of fluid. The coolant fluid may be water. Desirably, the coolant fluid is water, but other coolant fluids may be used if desired.

Desirably, the fluid circulation circuit may be a closed circuit. Thus, the heat exchanger may employ a coolant fluid circuit operable independently of the water level inside the tank. This means that even with the water tank not completely filled e.g. due to interruption of its water source, the cooling operation of the heat may continue. The fluid circulation circuit may be a closed circuit in the sense of retaining/containing the coolant fluid so as to isolate it from contact with anything else (e.g. isolated from the water being cooled, from the environment etc.)

The external heat exchanger may comprise a fluid inlet for receiving an upward convection flow of said coolant fluid from the internal heat exchanger, and a fluid outlet for outputting a downward convection flow of said coolant fluid to the internal heat exchanger, wherein the external heat exchanger is arranged within said fluid circulation circuit to define a fluid flow path which is inclined downwardly from the fluid inlet to the fluid outlet thereof. The slope/inclination in question dictates the coolant fluid circulation direction. While there is not a specific angle of inclination required to achieve coolant circulation, in general the bigger is the inclination/slope the faster the coolant fluid will circulate. It is to be noted, however, that with a design of the external exchanger able to provide a suitable pressure 'head' of coolant fluid (e.g. a 'hydro-head') at a highest point in the coolant fluid to help drive coolant fluid flow, it would be possible to have circulation with a "horizontal" external exchanger arrangement.

The passive water cooler may include coolant fluid flow conduits containing the coolant fluid and defining the fluid circulation circuit. Coolant fluid flow conduits formed from a metal are preferred because of the high thermal conductivity of metal permitting more efficient transfer of heat from water being cooled into coolant fluid within the flow conduit(s). However, non-metals (e.g. plastics) are also useable for forming coolant fluid flow conduits. The cross sectional profile of coolant fluid flow pipes provided within the heat exchanger, may be any shape selected from a range of shapes including: circular; square; rectangular; oval; polygonal; other. The external heat exchanger as well the internal heat exchanger may be realized with many different materials, shapes and configurations than those illustrated in exemplary embodiments shown herein.

The external heat exchanger may comprise a fluid reception chamber uppermost within the fluid circulation circuit for receiving the upward convection flow of coolant fluid from the fluid inlet, and one or more (desirably, a plurality) of fluid flow conduits extending downwardly from the fluid reception chamber to the fluid outlet each thereby defining the inclined fluid flow path. The upper fluid reception chamber of the external chamber may be bigger (more capacity) than the fluid sump (which may be at the bottom end of the external exchanger). The upper chamber acts also as integrated expansion vase/chamber. It promotes/provides a greater 'pressure head' in the coolant fluid to help drive coolant fluid flow. In order to further promote coolant fluid circulation, the upper fluid level accommodated by upper fluid reception chamber may be higher than the higher end of the sloped fluid flow conduits where they extend from upper fluid reception chamber of the external exchanger.

One or both of the internal heat exchanger and the external heat exchanger may comprise coolant fluid flow conduits containing the coolant fluid and forming a part of the fluid circulation circuit. The formation of the flow of coolant fluid is induced by a difference of fluid density. However, while the piping of the heat exchanger need not be vertical, and may be inclined to the vertical axis, in use, it is preferable that vertical piping is employed as this may provide a shorter path for connection between the internal and the external heat exchanger. The shorter path reduces the coolant fluid circuit's hydraulic load losses. For example, that the pipes of the internal heat exchanger which convey coolant fluid to the external exchanger, may be substantially vertical to assist the formation of convection flow.

The coolant fluid flow conduit may be formed from thermally conductive material, such as metal, as described above.

The proportion of the volume of the water tank occupied by the coolant fluid flow conduit(s) may be less than the proportion of the volume thereof available for containing the volume of water to be cooled. The water tank may have a capacity of between about 500 litres and about 2000 litres (e.g. about 1500 Litres). The passive water cooler may form a part of, or be arranged for use in, a gravity-fed emergency shower unit arranged to provide at least 10 minutes (e.g. 15 minutes) of continuous water flow at a rate of not less than 50 litres per minute, or preferably at a rate of not less than 76 litres per minute. In order to achieve this, the volume of the water tank occupied by the coolant fluid flow conduit(s) may be less than the proportion of the volume thereof available for containing the volume of water to be cooled to an extent sufficient to maintain a suitably high pressure head of water within the water tank so as to achieve/enable this continuous shower flow rate. The passive waster cooler may form a part of, or be arranged for use in, a gravity-fed emergency eye-bath/shower unit arranged to provide at least 10 minutes (e.g. 15 minutes) of continuous water flow at a rate of not less than 10 litres per minute, or preferably at a rate of not less than 12 litres per minute. In order to achieve this, the volume of the water tank occupied by the coolant fluid flow conduit(s) may be less than the proportion of the volume thereof available for containing the volume of water to be cooled to an extent sufficient to maintain a suitably high pressure head of water within the water tank so as to achieve/enable this continuous shower flow rate.

The fluid circulation circuit may comprise fluid flow conduits disposed to extend upwardly within the water tank in a direction from the internal heat exchanger towards the external heat exchanger.

The internal heat exchanger may be disposed to extend into the volume/cavity of the water tank (e.g. so as to be fully within the tank and below the uppermost watermark/edge of the tank) so as to permit the internal heat exchanger to be fully immersed or submerged within the water tank when the water tank if partially of fully filled with water. The fluid circulation circuit may comprise fluid flow conduits that extend through at least 50%, or at least 70%, of the internal height/depth of the water tank (e.g. at least 50%, or at least 70%, of the maximum depth of water achievable within the tank when full). Desirably, the greater the surface area of the contact interface between the internal heat exchanger and the water being cooled, the better. However, it is to be understood that the internal hear exchanger, in some implementations of the invention, may not be disposed to extend fully into the volume/cavity of the water tank and may only partially extend into the tank e.g. so as to 'dip' a part of (but not all of) a coolant fluid flow pipe(s) of the internal heat exchanger below the surface of water within the water tank, in use, while keeping other parts of the coolant fluid flow pipe(s) above water. In that way, contact between the coolant fluid flow pipe(s) and the water may be achieved without full submersion/immersion of the former within the latter.

The internal heat exchanger may comprise a plurality of fluid flow conduits arranged within the fluid circulation circuit to bifurcate a coolant fluid flow path(s) from the external heat exchanger and to subsequently recombine the bifurcated coolant fluid flow path(s) for output to the external heat exchanger. Some of, the majority of, or substantially all of the fluid flow conduits and/or pipe sections of the heat exchanger (internal and/or external) may preferably be substantially linear so as to avoid the formation of turbulence or eddies in coolant fluid flow which may reduce the rate of coolant fluid flow and hinder heat exchange.

The plurality of fluid flow conduits of the internal heat exchanger may be disposed to extend upwardly within the water tank in a direction from the internal heat exchanger towards the external heat exchanger. Upward orientation promotes more efficient convective flow of coolant fluid.

The fluid circulation circuit may act as a thermal syphon.

The passive water cooler may cool water to an average temperature of between about 1° C. and about 2° C. of the average lowest ambient temperature experienced by the external heat exchanger (e.g. a night-time temperature). The passive water cooler may cool water to an average temperature of between about 1° C. and about 3° C. of the average lowest ambient temperature experienced by the external heat exchanger. The passive water cooler may cool water to an average temperature of between about 1° C. and about 5° C. of the average lowest ambient temperature experienced by the external heat exchanger. The passive water cooler may cool water to an average temperature differing from of the average lowest ambient temperature experienced by the external heat exchanger, by not more than about 1° C., or about 2° C., or about 3° C., or about 4° C., or about 5° C. The average lowest ambient temperature in question may be the average (e.g. a 'running average') of a plurality of successive lowest ambient temperatures over successive temperature cycles (e.g. 2 of more, or 5 or more day/night cycles). The passive water cooler may cool water to a temperature maintained within this average temperature range for at least one day (24 hours), or several/many days, or perpetually.

The passive water cooler may be arranged to passively cool water to a temperature defined as 'tepid' according to the ANSI/ISEA Z358.1, "Emergency Eyewash and Shower Equipment." The water may be 'potable' water within the meaning of this standard. The passive water cooler may be arranged to passively cool water to a temperature of less than 38° C. (or about 38° C.) when the ambient temperature experienced by the external heat exchanger varies between values not more than about 55° C. and not less than about 30° C. over successive temperature cycles. Desirably, the passive water cooler may be arranged to passively cool water to a temperature of less than 38° C. (or about 38° C.) when the ambient temperature experienced by the external hear exchanger varies between an average upper value of between about 50° C. and about 55° C., and an average lower value of between about 30° C. and about 35° C. over successive temperature cycles.

The thermal insulating material of the water tank may comprise a low thermal conductivity material having a uniform thickness of between about 1 cm and about 10 cm. The thermal conductivity of the material may be of value of between about 0.01 W/mK and about 0.1 W/mk. The thermal insulating material of the water tank may be arranged in contact with the water tank or may be separate from the water tank. For example, the water tank may comprise a water reservoir part/assembly and a thermal insulating part/assembly. The thermal insulating part/assembly may surround, enclose or envelope the water reservoir part/assembly of the water tank. The thermal insulating part/assembly may comprise one or more panels of thermal insulating material. The 'R-value' of one, some or each of the thermal insulation panels may be preferably at least 1.5 m²K/W and more preferably at least 1.8 m²K/W, when measured in association with thermal insulation panels comprising a thermal insulation material of 40 mm in thickness. An 'R-value' is a quantity defined as:

$$R = \text{(thickness of the specimen)/(apparent thermal conductivity)}$$

An R-value quantifies an insulating panel's 'thermal resistance' to conductive heat flow as measured in terms of its thermal resistance. The higher the R-value, the greater the insulating effectiveness. The R-value of a thermal insulating panel may be measured in accordance with the ASTM Standards Designation: C 1155—"Standard Practice for Determining Thermal Resistance of Building Envelope Components from the In-Situ Data".

In another aspect, the invention may provide an emergency shower unit comprising a passive water cooler as described above, arranged for cooling the water supply of the emergency shower unit.

In yet another aspect, the invention may provide an emergency eye-wash unit comprising a passive water cooler as described above, arranged for cooling the water supply of the emergency eye-wash unit.

The term 'about' when used in this specification refers to a tolerance of +10%, of the stated value, i.e. about 50% encompasses any value in the range 45% to 55%, In further examples, aspects or embodiments 'about' refers to a tolerance of +5%, +2%, +1%, +0.5%, +0.2% or 0.1% of the stated value.

DESCRIPTION OF EMBODIMENTS

Figure 1:
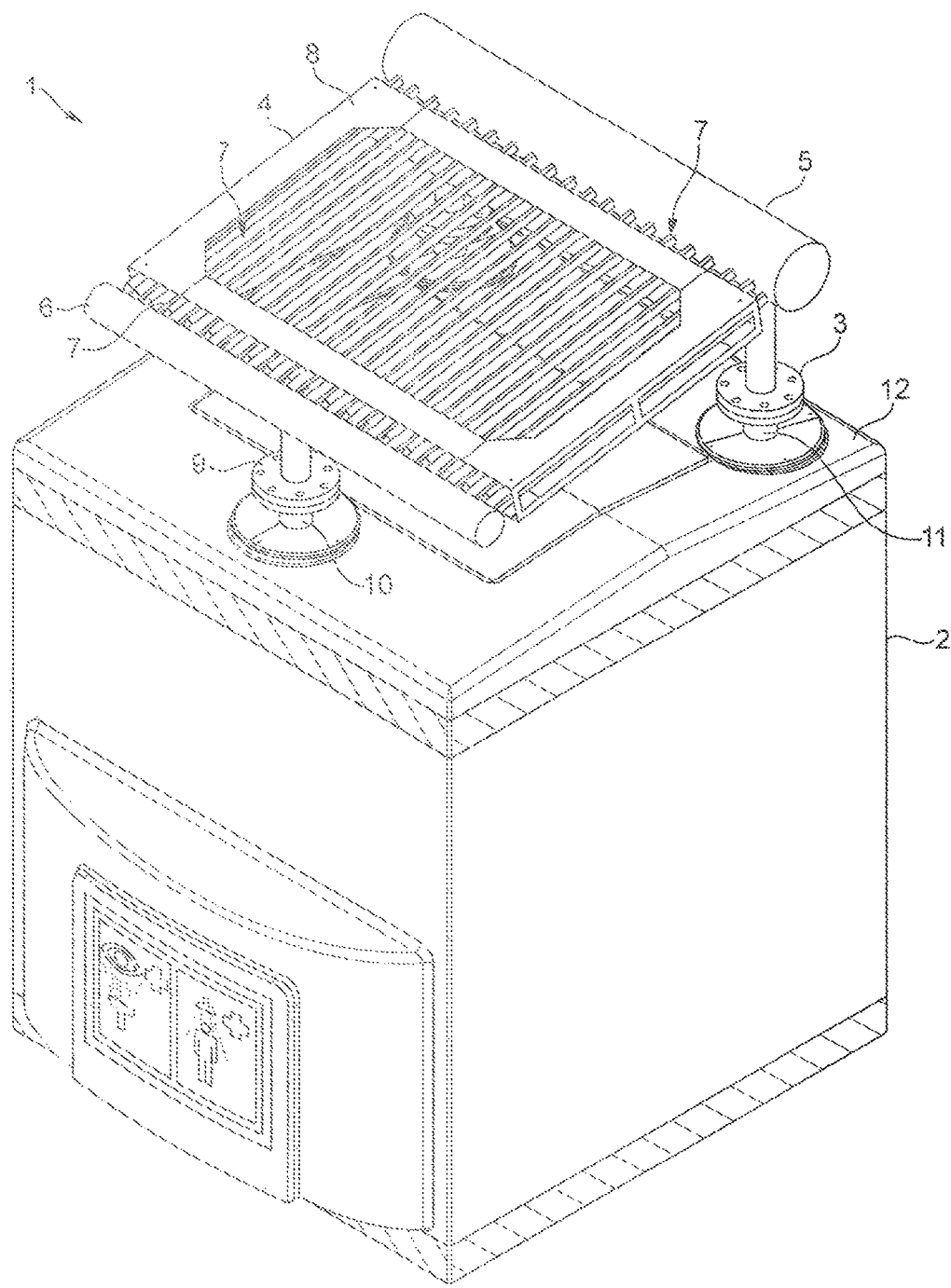
FIG. 1 illustrates a view of a passive water cooler unit according to an example of the invention.

FIG. 1 illustrates a passive water cooler unit 1 comprising a water tank (not shown) contained within a housing assembly 2, an external heat exchanger 4, disposed outside the water tank and outside the housing assembly in thermal communication with an internal heat exchanger (not shown) disposed inside the water tank. The external heat exchanger and the internal heat exchanger are arranged within a mutual fluid circulation circuit configured to contain (and, in use, containing) coolant fluid which flows around the fluid circulation circuit by a process of convection. This convective coolant fluid flow enables thermal communication between the external heat exchanger and the internal heat exchanger in order to transfer heat between them. Heat from within the water contained within the water tank (not shown) is absorbed by the coolant fluid within the internal heat exchanger immersed within the water in question, and, by a process of convective flow, the coolant fluid is permitted to circulate from the immersed internal heat exchanger to the external heat exchanger to permit heat from the coolant fluid to radiate from the external heat exchanger into the external ambient environment when that environment is cooler than the external heat exchanger.

Figure 4:
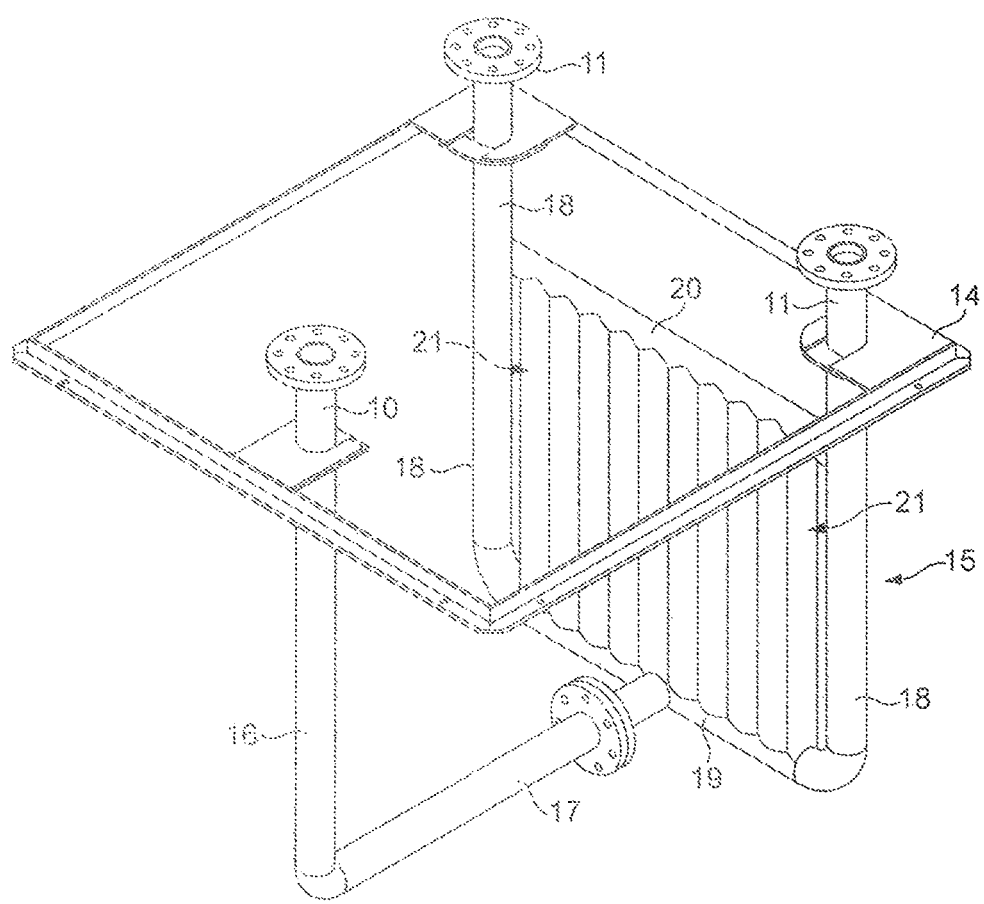
FIG. 4 illustrates a view of an internal heat exchanger located for placement within the water tank portion of the passive water cooler unit of FIG. 1, and including an adapter frame for that purpose.

The fluid circulation circuit includes a pair of internal heat exchanger outlet pipes 11 that each extend from the internal heat exchanger and protrude upwardly out from the water tank, through the roof 12 of the housing assembly 2. Each one of a corresponding pair of external heat exchanger inlet pipes 3 of the external heat exchanger is connected to a respective one of the pair of internal heat exchanger outlet pipes 11 of the internal heat exchanger, so as to continue the fluid circulation circuit and to place the fluid output of the internal heat exchanger in fluid communication with the fluid input of the external heat exchanger 4. Similarly, the fluid circulation circuit includes an internal heat exchanger inlet pipe 10 of the internal heat exchanger which also extends from the internal heat exchanger and protrudes outwardly from the water tank, through the roof of the housing assembly. An external heat exchanger outlet pipe 9 of the external heat exchanger is connected to internal heat exchanger inlet pipe 10 of the internal heat exchanger, in fluid communication with it so as to continue the fluid circulation circuit and place the fluid output of the external heat exchanger in fluid communication with the fluid input of the internal heat exchanger (not shown in FIG. 1: see item '15' of FIG. 4). The fluid outlet and inlet pipes of the internal heat exchanger and the external heat exchanger are each linear and disposed substantially vertically. The axis of the pipe bore of each fluid inlet pipe is substantially co-linear with the pipe bore of the fluid outlet pipe to which it is connected. The fluid inlet and outlet pipes of the external heat exchanger extend substantially vertically from/to the underside of that heat exchanger. The fluid outlet pipes of the internal heat exchanger (FIG. 2, detail A; FIG. 4) extend substantially vertically from it.

The external heat exchanger inlet pipes 3 of the external heat exchanger are in fluid communication with its external heat exchanger output pipe 9 solely via the external heat exchanger itself. Similarly, the internal heat exchanger inlet pipe 10 of the internal heat exchanger is in fluid communication with its internal heat exchanger outlet pipes 11, via the internal heat exchanger itself. Accordingly, the internal heat exchanger, the external heat exchanger and the inlet and outlet pipes connecting the two provide a closed and complete fluid circulation circuit configured to contain (and, in use, containing) coolant fluid which is able to flow around the fluid circulation circuit by a process of convection to move heat within the coolant fluid around the circuit, from the internal heat exchanger to the external heat exchanger, for dissipation.

The external heat exchanger includes an upper coolant collection chamber 5 which comprises an elongated tubular duct extending across the roof 12 of the housing assembly from one external heat exchanger inlet pipe 3 of the pair of fluid inlet pipes, to the other, so as to place both of the two fluid inlet pipes of the external heat exchanger in fluid communication with each other via the collection chamber. The elongate tubular duct of the coolant collection chamber is disposed immediately above each of the two external heat exchanger inlet pipe 3, so as to collect upwardly rising/convicting coolant fluid flowing out from them, and is closed at each terminal end to define a chamber for collecting this rising coolant fluid input to it from the internal heat exchanger. The two fluid inlet pipes of the external exchanger are vertical to permit efficient upward convection of heated coolant fluid from the internal heat exchanger to the coolant collection chamber.

The external heat exchanger includes a radiator assembly 8 comprising a grille-like array of a plurality of fluid flow pipes 7 each extending mutually in parallel from the upper coolant collection chamber 5 along a downwardly inclined path to a lower coolant sump 6. The lower coolant sump 6 comprises an elongate tubular duct extending across the roof 12 of the housing assembly. The length of the tubular duct of the lower coolant sump is substantially the same as the length of the tubular duct of the upper coolant collection chamber 5. This permits the plurality of fluid flow pipes 7 to extend from respective separate, regularly-spaced locations disposed along substantially the whole length of the upper coolant collection chamber to the lower coolant sump, in parallel. Each of the fluid flow pipes 7 of the radiator grille places the upper coolant collection chamber in fluid communication with the lower coolant sump, thereby permitting coolant fluid to follow the inclined downward path through the fluid flow pipes and to transfer heat to the fluid flow pipes which is subsequently radiated away from the radiator grille array when the ambient environment surrounding the group array is at a lower temperature than the coolant fluid. The upper coolant collection chamber 5 is vertically higher than the lower coolant sump. This permits a downward flow of coolant fluid through the radiator assembly as it transfers some of its heat to the material of the radiator assembly, which then radiatively dissipates that heat away into the ambient environment, thereby progressively cooling within the radiator assembly. Each fluid flow pipe 7 of the radiator assembly 8 connects to an underside, lower side/wall region of the fluid collection chamber, forming a fluid communication with it there, to receive a downward flow of coolant fluid from that chamber.

The tubular duct of the lower coolant sump is closed at each terminal end to define a chamber for collecting the falling coolant fluid input to it from the fluid flow pipes of the external heat exchanger. The external heat exchanger outlet pipe 9 of the external heat exchanger is connected in fluid communication with the floor of the elongate tubular duct of the coolant sump 6, at the mid-point of the length of the lower coolant sump, so as to output a downwardly falling/convecting coolant fluid flow from the lower coolant sump. This outlet pipe is vertical to permit efficient downward convection flow of cooled coolant fluid from the coolant sump to the internal heat exchanger.

The volume/capacity of the upper coolant collection chamber 5 is greater than the volume/capacity of the lower coolant sump. This permits a greater quantity of relatively warm, and therefore less dense, coolant fluid to be collected in the coolant fluid collection chamber relative to the lower coolant sump to promote the downward ('down-hill') flow of coolant fluid. The upper coolant collection chamber (5) is bigger than the coolant sump (6) so as to act as an expansion vase/chamber and provide a pressure 'head' to promote coolant fluid flow.

As the coolant fluid cools by radiative dissipation of heat from the radiator assembly, and becomes more dense as a result. The denser, cooler coolant fluid thereby tends to 'sink' away from the upper, warmer coolant fluid collection chamber, down towards the lower coolant sump via the inclined fluid flow pipes of the radiator assembly. This arrangement promotes effective coolant fluid circulation when the radiator assembly of the external heat exchanger is warmer than the ambient environment within which it is disposed, and is therefore able to dissipate heat as described above.

Conversely, when the radiator assembly of the external heat exchanger is cooler than the ambient environment within which it is disposed, and is unable to dissipate heat as described above, the coolant fluid within the external heat exchanger would tend to absorb heat from the ambient environment and become warmer. This warmer coolant fluid would become less dense and would tend to rise within the radiator assembly along the inclined fluid flow pipes towards the coolant fluid collection chamber. This blocks the upward flow/rise of any warm (but not as warm) coolant fluid from the internal heat exchanger into the coolant fluid collection chamber. Fluid circulation ceases in these circumstances. The stratification of the coolant fluid permits a thermocline to form within the fluid inlet/outlet pipes of the fluid circulation circuit at locations between the external heat exchanger and the internal heat exchanger where the inlet/outlet pipes pass from the ambient external environment into the enclosed in an environment of the housing assembly 2.

These thermoclines provide an effective barrier to coolant fluid flow within the coolant fluid circulation circuit.

In practice, this means that circulation of coolant fluid is inhibited during a relatively hot daytime period, but is promoted during a subsequent relatively cool night-time period. Accordingly, during a warm or hot day, coolant fluid is prevented from flowing within the coolant fluid circulation circuit and so prevented from transferring heat from the warm/hot daytime ambient environment into the water with the water tank. Similarly, during the following cool or cold night, coolant fluid is permitted/encouraged to flow within the coolant fluid circulation circuit and so transfer heat from the water with the water tank to the cool/cold night-time ambient environment.

The present invention takes advantage of this effect in order to provide a passive water cooler. The housing unit 2 containing the water tank, is arranged to provide a thermally insulated enclosure substantially surrounding the water tank (substantially fully surrounding it) and thermally insulating it from direct contact with the external environment in which the external heat exchanger resides. This means that substantially the main (e.g. only) thermal communication between the external environment and the water contained within the housed water tank, comes via the part of the coolant fluid circulation circuit that passes through the external heat exchanger. This means that temperature variations in the coolant fluid of the heat exchanger are the dominant influence upon changes in the water contained within the water tank thermally enclosed within the housing unit. In preferred embodiments, the external surface of the external heat exchanger is black (e.g. a black material or pained/coated with a black material). This enhances the ability of the external heat exchanger to radiate-away heat that is transferred to it from the internal heat exchanger via the coolant fluid circulation circuit, when the ambient environment around the external heat exchanger is cooler than the external heat exchanger. It also enhances the ability of the external heat exchanger to radiatively absorb heat from the ambient environment when that environment is warmer than the external heat exchanger thereby to promote formation of thermoclines as described above for the purposes of inhibiting coolant fluid circulation as desired. The temperature of the external heat exchanger may be significantly enhanced by providing it with a black (preferably non-reflective, e.g. matt-black) external surface. The maximum temperature of the external heat exchanger may, when exposed to direct sunlight, approach/approximate a 'Black Bulb' temperature for those ambient conditions. The 'Black Bulb' temperature of a body is well known in the art as being the temperature measured at a (notionally) perfectly non-reflective black surface placed directly in the line of thermal radiation (e.g. sunlight). This condition may be reached/approximated on the external exchanger (that is black and exposed to the sun) during summer days in the Middle-Eastern countries, for example. The cooling cycle of the heat exchanger is not affected since this takes place during evening/night when the sun radiation is limited or zero. It is also noted that the black surface of the external heat exchanger allows it to act, thermally speaking, approximately in the manner of a 'Black-Body' radiator which is the notional/idealised body possessing the quality of being an ideal emitter of radiation as well as an ideal absorber. Thus, the external heat exchanger may preferentially absorb radiant heat energy (sunlight) during the day so as to induce coolant fluid stagnation/thermocline and may preferentially emit thermal radiation during the night time to induce a flow of coolant fluid within it and the removal of heat within the water being cooled by the heat exchanger.

Figure 2:
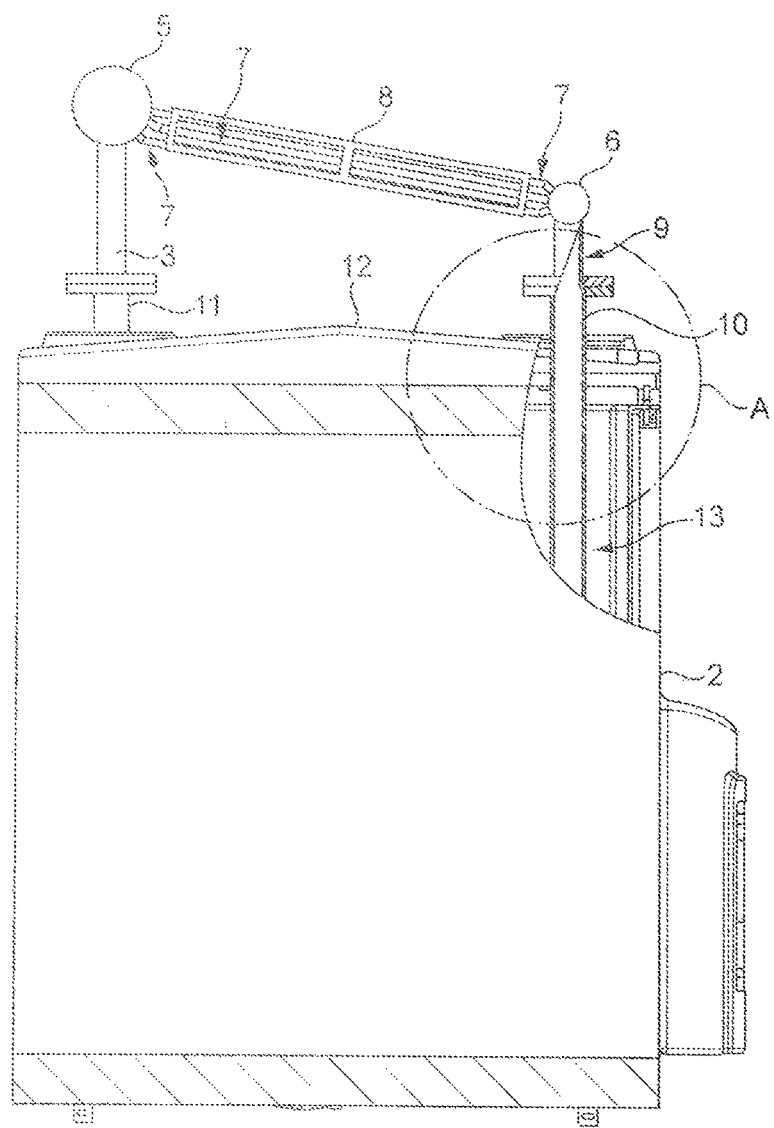
FIG. 2 illustrates a side view of the passive water cooler unit of FIG. 1, also showing a cut-away section.
Figure 3:
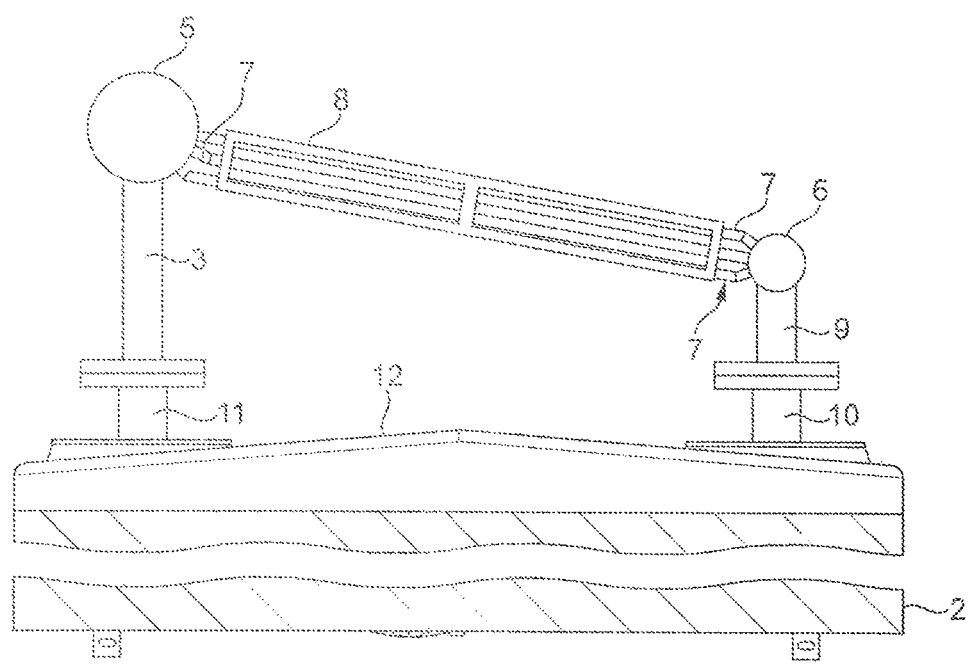
FIG. 3 illustrates a magnified view of the side view of the passive cooler unit of FIG. 2 focusing on an external heat exchanger, and a omitting water tank portion (between dashed lines) of the unit, for clarity.

FIG. 2 illustrates a side view of the passive water cooler unit of FIG. 1, also showing a cut-away section (A) in which the internal heat exchanger inlet pipe 10 is revealed extending to the inner heat exchanger located within the inner space/volume 13 of the water tank housed within the housing 2 of the water cooler unit. FIG. 3 illustrates a magnified view of the side view of the passive cooler unit of FIG. 2 focusing on an external heat exchanger, and omitting the water tank portion (between dashed lines) of the unit, for clarity.

FIG. 4 illustrates an isolated view of the internal heat exchanger 15 located within the water tank portion (not shown) of the passive water cooler unit of FIGS. 1 to 3. The heat exchanger is shown mounted upon a mounting adapter frame 14 via which it is attached to the upper rim of the enclosure provided by the housing assembly 2 in a position that places the internal heat exchanger within the inner space/volume 13 of the water tank while placing the internal heat exchanger inlet pipe 10 and outlets 11 outside of the water tank in a position accessible to the coolant fluid outlet 9 and inlets 3, respectively, of the external heat exchanger.

The internal heat exchanger comprises an array of ten fluid bifurcation flow pipes 21 (a number other than ten may be employed each individually joined at its upper end to a mutual upper cross-flow pipe 20, and each is also individually joined at its lower end to a mutual lower cross-flow pipe 19. Each bifurcation flow pipe is in fluid communication with the upper and lower cross-flow pipes to which it is joined, and each provides, at its lower end, a point of bifurcation of the flow of coolant fluid flowing along either of the lower cross-flow pipe towards the bifurcation flow pipe in question. Conversely, each fluid bifurcation flow pipe also provides, at its upper end, a point of convergence of the flow of bifurcated coolant fluid along the bifurcation flow pipe in question towards the upper cross-flow pipe 20. Thus, a bifurcation and subsequent convergence of coolant fluid is permitted to as to increase the cross-sectional area of the internal heat exchanger, and the coolant fluid within it, which is able to thermally communicate/couple to the water within the water tank, to enhance the cooling thereof. The arrangement of the multiple bifurcation flow pipes 21, up-flow pipes 18 and upper/lower cross-flow pipes (20, 19) collectively form a grill. Each bifurcation flow pipe is separated from its neighbouring bifurcation pipe and any neighbouring up-flow pipe, by a clear gap through which water within the water tank may freely flow. This aims to improve the surface area contact between the internal heat exchanger and the water within which it is immersed, and which it is arranged to cool.

Each bifurcation flow pipe comprises a respective internal pipe bore having a substantially linear longitudinal pipe axis. The pipe axes of each of the ten bifurcation flow pipes are parallel to each other, substantially vertical and reside in a common vertical plane. The upper and lower cross-flow pipes each comprise a respective internal pipe bore having a substantially linear longitudinal pipe axis. The axes of the upper and lower cross-flow pipes are mutually parallel to each other, substantially horizontal (in use) and substantially linear. The upper and lower cross-flow pipes are connected, in fluid communication, at opposite respective ends, to a respective one of two parallel and substantially vertical up-flow pipes 18. Each up-flow pipe comprises a respective internal pipe bore having a substantially linear longitudinal pipe axis, and the pipe axes of each are parallel to each other, substantially vertical and reside in the vertical plane in which the axes of the bifurcation flow pipes reside.

Each up-flow pipe has its pipe axis aligned to be collinear with the pipe axis of a respective one of the two internal heat exchanger outlet pipes 11 of the internal heat exchanger and to be collinear with the pipe axis of a respective one of the two external heat exchanger inlet pipes 3 of the external heat exchanger. This vertical alignment assists in efficient coolant fluid flow of heated coolant fluid from the internal heat exchanger to the external heat exchanger by convection.

The internal heat exchanger also includes a substantially vertical down-flow pipe 16 extending from the internal heat exchanger inlet pipe 10 of the internal heat exchanger, and comprising an internal pipe bore having a substantially linear longitudinal pipe axis, disposed to be parallel and collinear with the external heat exchanger outlet pipe 9 of the external heat exchanger. The lowermost end of the down-flow pipe is connected in fluid communication with one end of a linear and substantially horizontal coolant feeder pipe 17 which is connected in fluid communication with the lower cross-flow pipe 19 at the mid-section/middle of the length of the lower cross-flow pipe at one side. The effect is to feed cooled, and a relatively more dense, coolant fluid from the external heat exchanger which has descended vertically down the down-flow pipe 16 to the feeder pipe, and there to feed the cooled coolant fluid to the middle of the lower cross-flow pipe which bifurcates the cooled coolant fluid to disperse it through the grille array of bifurcation flow pipes 21 of the internal heat exchanger. Of course, during this entire process, the cooled coolant fluid within the down-flow pipe 16, within the feeder pipe 17, and within the grille array of bifurcation flow pipes 21 and up-flow pipes 18, is in thermal communication with the water within which the internal heat exchanger is immersed and is able to extract heat from the water for subsequent convective transfer to the external heat exchanger as described above.

The grille array of bifurcation flow pipes of the internal heat exchanger is arranged vertically below the external heat exchanger inlet pipes 3 of the external heat exchanger to permit an efficient convective upward flow of coolant fluid within the external heat exchanger which has acquired heat from the water within which it is immersed, has become less dense as a consequence and has a propensity to rise.

Of course, other arrangements are possible without departing from the concept of the present invention. For example, in other arrangements and embodiments, the internal heat exchanger may possess none of the bifurcation flow pipes 21, nor the upper cross-flow pipe 20. In that case, such an arrangement would comprise the down-flow pipe 16, the feeder pipe 17, the lower cross-flow pipe 19, and both up-flow pipes 18. In yet further arrangements and embodiments, the cross-flow pipe 19, and the two-flow pipes 18 may be curved pipes which share a common radius of curvature and collectively form/trace a part of a circle, rather than three of the four sides of a rectangle/square shape traced by the example illustrated in FIG. 4.

In other arrangements, the external heat exchanger may comprise only one (i.e. a single) coolant external heat exchanger inlet pipe 3, with the other one of the pair of coolant fluid inlet pipes shown in the figures being entirely omitted, and in this alternative arrangement the external heat exchanger outlet pipe 9 of the external heat exchanger would be connected in fluid communication with one of the two internal heat exchanger outlet pipes 11 of the internal heat exchanger, with the coolant internal heat exchanger inlet pipe 10, the down-flow pipe 16 and the feeder pipe 17 being entirely omitted. In this arrangement, the internal heat exchanger 15 would comprise the grille array described above, in which one of the two up-flow pipes 18 is re-purposed as a down-flow pipe defeat the grille array with coolant fluid while the other of the two up-flow pipes 18 continues to serve as an-flow pipe. The coolant fluid circulation circuit would then circulate coolant fluid from a single coolant external heat exchanger inlet pipe 3 of the external heat exchanger to the single external heat exchanger outlet pipe 9 thereof.

In other arrangements, the up-flow and/or down-flow and/or bifurcation pipework of the internal heat exchanger may be other than vertical, and other than linear. For example the pipework may be curved, and/or the pipework may be inclined relative to the vertical axis (e.g. so as to extend laterally across the volume/space of the water tank as well as concurrently extending vertically through it. This may improve/increase the overall length of the pipework and the cross-sectional area of the internal heat exchanger able to thermally communicate with water within the water tank.

Figure 5:
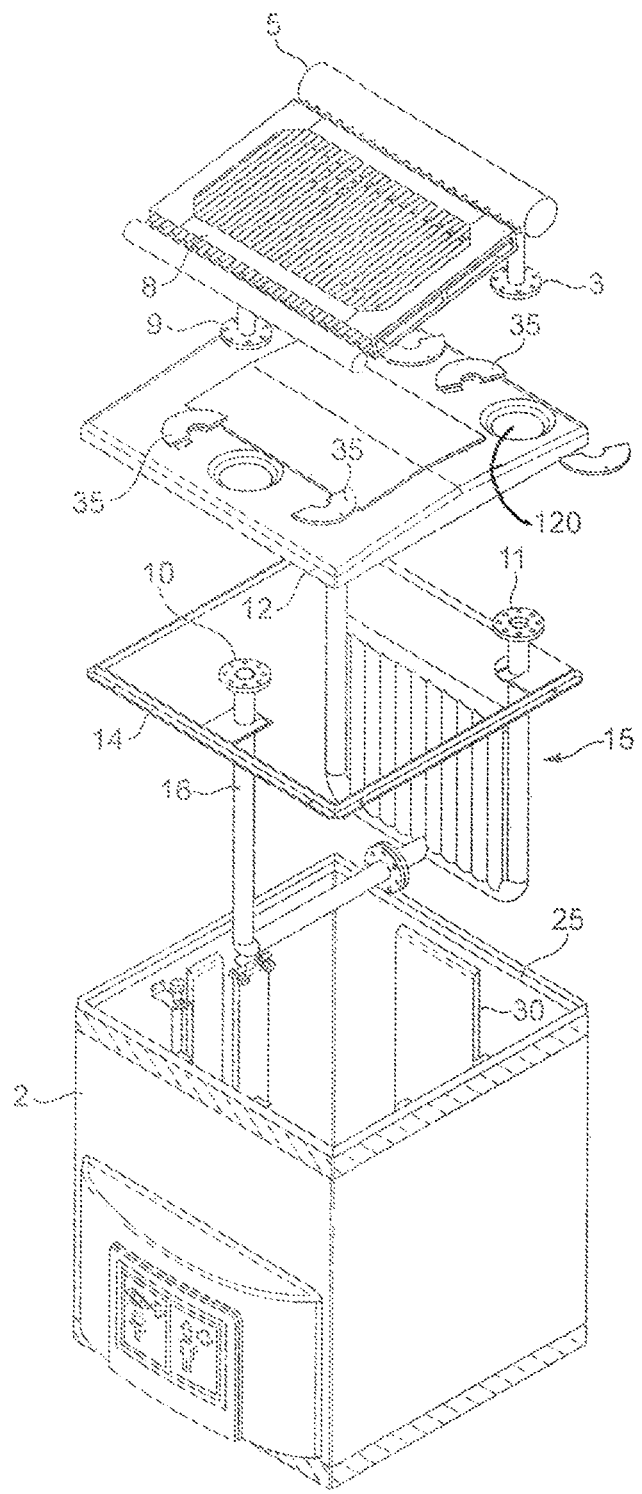
FIG. 5 illustrates an exploded view of the passive water cooler unit of FIG. 1, showing the external heat exchanger and the internal heat exchanger, and showing the internal volume of the water tank portion.

FIG. 5 shows an exploded view of the components of the passive water cooler of FIG. 1 for a better understanding of the relative positioning of the component parts described above. It is noted that, in FIG. 5, through-openings 120 are shown in the roof part 12 of the housing enclosure which are shaped and adapted to allow passage of coolant fluid inlet/outlet pipes (10, 11) of the internal heat exchanger. Insulating collars 35 are also shown which are formed in two halves (i.e. split collars) to be brought together around the external circumference of an inlet/outlet pipe to circumscribe the pipe and clasp it within the collar so assembled. The lateral surface of the collar so assembled thereby provides an annular shape/disc the lower annular surface of which is adapted to cover those parts of the through-openings 120 in the roof part 12 which are not occupied by the coolant fluid inlet/outlet pipework. In this way the insulating collars 35 provide thermal insulation between the internal volume/enclosure of the housing unit 2, which contains the water tank 30, and the external environment within which the external heat exchanger resides. The adapter frame 14 of the internal heat exchanger is constructed and arranged to interface with, and be mounted upon, the upper peripheral edge 25 of the housing unit.

Figure 6:
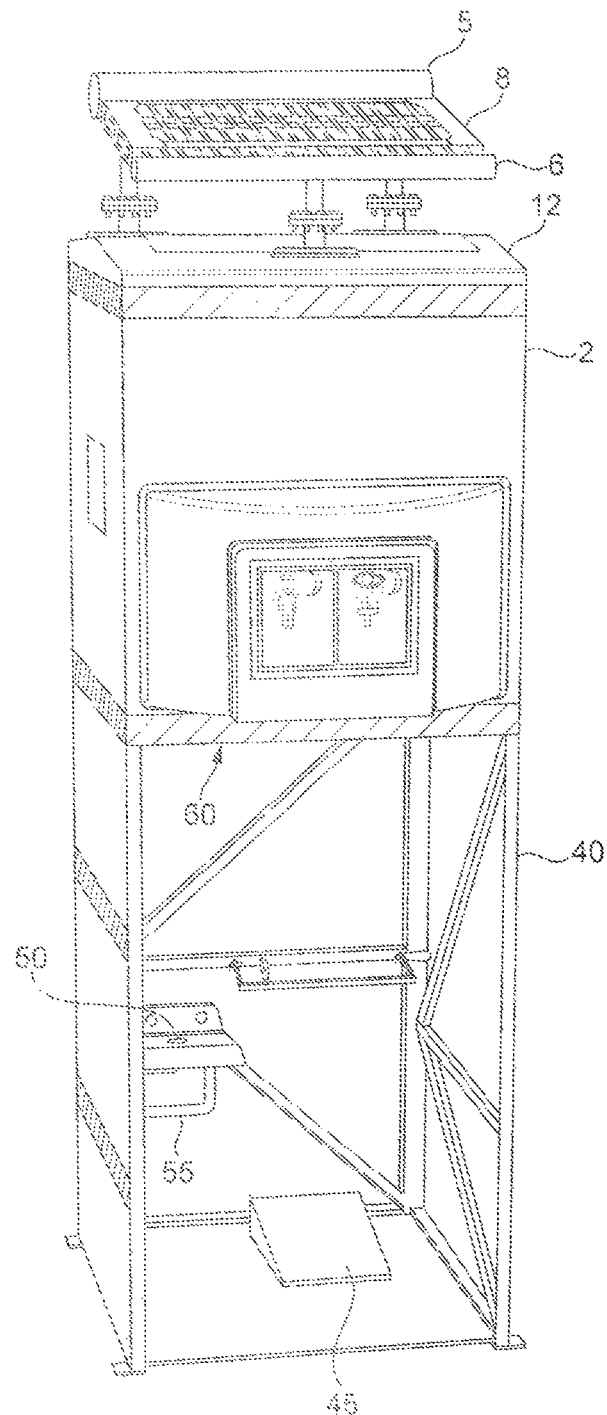
FIG. 6 illustrates a view of an emergency shower unit upon the roof of which is disposed a passive water cooler unit according to FIG. 1.

FIG. 6 shows a view of an emergency shower unit 40 upon the top of which is disposed a passive water cooler unit described above. The emergency shower unit comprises a shower cubicle having a shower water outlet head (not shown) located within the ceiling 60 of the shower cubicle. The shower water outlet head is in fluid communication with the water tank housed within the housing unit 2 of the passive water cooler and serves as a supply of water for the shower water outlet head. A supply of water to the shower water outlet head, from the water tank, is controlled by depressing or releasing a foot panel 45 located in the floor of the shower cubicle. Water valve activation (for the shower head) may be achieved by multiple means (e.g. a panic bar/foot pedal) but also optionally by provision of a pull handle. A washing basin is disposed within the shower cubicle and comprises an emergency eye-bath/eye-wash shower or spraying nozzle 50, which is arranged in fluid communication with the water tank via water supply pipework (not shown), such that the water tank serves as a source of emergency eye-washing water. A waste water outlet-pipework 55 permits disposal of waste water from the eye-wash shower.

Figure 7:
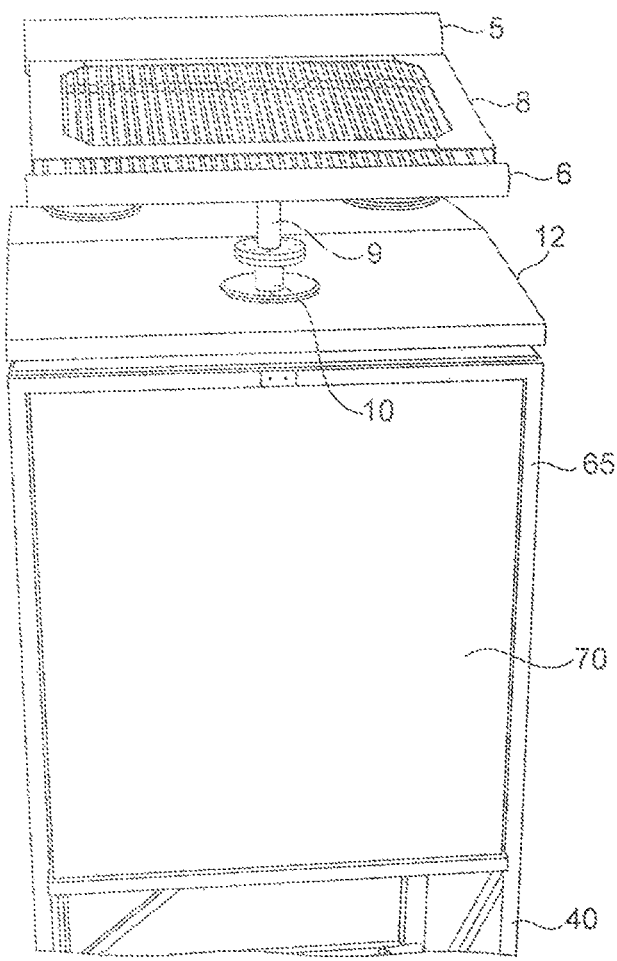
FIG. 7 illustrates a view of the passive water cooler unit located on top of the emergency shower unit of FIG. 6, in which an outer housing of the passive water cooler unit is removed to expose a panel of thermally insulating material.

FIGS. 7 to 10 show four different views of the emergency shower unit 40 and the component parts of the passive water cooler unit disposed upon it. FIG. 7 illustrates a view of the emergency shower unit (top section) in which the external panels of the housing unit are removed to reveal the frame assembly 65 of the housing unit within which thermal insulation panels 70 are mounted. These thermal insulation panels provide a thermal barrier between the external/ambient environment within which the external heat exchanger resides, and the internal volume/enclosure of the housing unit within which the water tank resides. Such thermal insulation panels are provided at each vertical side (four sides of the generally cubic enclosure defined by the housing unit, and also along the floor of the enclosure (not shown). The roof assembly 12 of the housing assembly also contains thermal insulation panels such that the enclosure defined by the housing assembly provides thermal insulation around all sides, at its ceiling and at its floor.

For example, the thermal insulation material may comprise a low thermal conductivity material having a uniform thickness of between about 1 cm and about 10 cm. The thermal conductivity of the material may be of value of between about 0.01 W/mK and about 0.1 W/mK. The 'R-value' of one, some or each of the thermal insulation panels may be preferably at least 1.5 m²K/W and more preferably at least 1.8 m²K/W, when measured in association with thermal insulation panels comprising a thermal insulation material of 40 mm in thickness. An 'R-value' is a quantity defined as the ratio:

$$R = \text{(thickness of the specimen)/(apparent thermal conductivity)}$$

An R-value quantifies an insulating panel's 'thermal resistance' to conductive heat flow as measured in terms of its thermal resistance. The higher the R-value, the greater the insulating effectiveness. The R-value of a thermal insulating panel may be measured in accordance with the ASTM Standards Designation: C 1155—"Standard Practice for Determining Thermal Resistance of Building Envelope Components from the In-Situ Data".

The thermal insulation panels may comprise aluminium coating on both sides of each panel. The forms of thermal insulation may be employed instead of thermal insulation panels, such as fibreglass insulation wall or insulation foam or other suitable thermal insulation located between the water tank and the walls, floor and ceiling of the housing unit containing the water tank.

Figure 8:
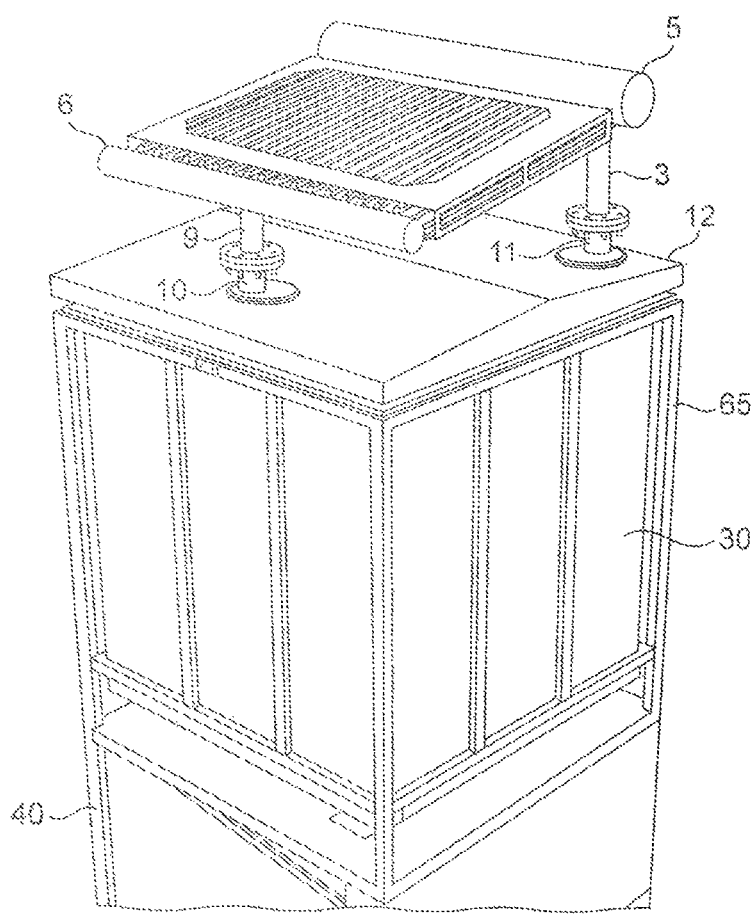
FIG. 8 illustrates a view of the water cooler unit upon the emergency shower unit also shown in FIG. 7, and in which the outer housing of the passive water cooler unit and the underlying panels of thermally insulating material are both removed to expose the water tank of the water cooler unit housed within a supporting framework/chassis of the water cooler unit.
Figure 9:
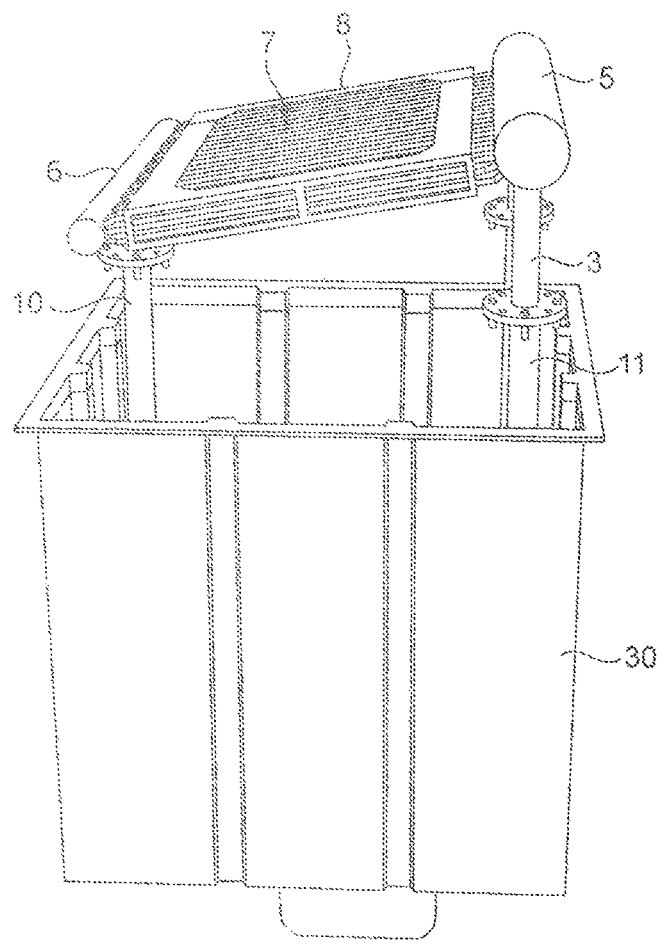
FIG. 9 illustrates a view of the water cooler unit of figure one or FIG. 8 in which external panels, insulation and chassis are removed to expose the water tank assembly and a heat exchanger assembly associated with the water tank.
Figure 10:
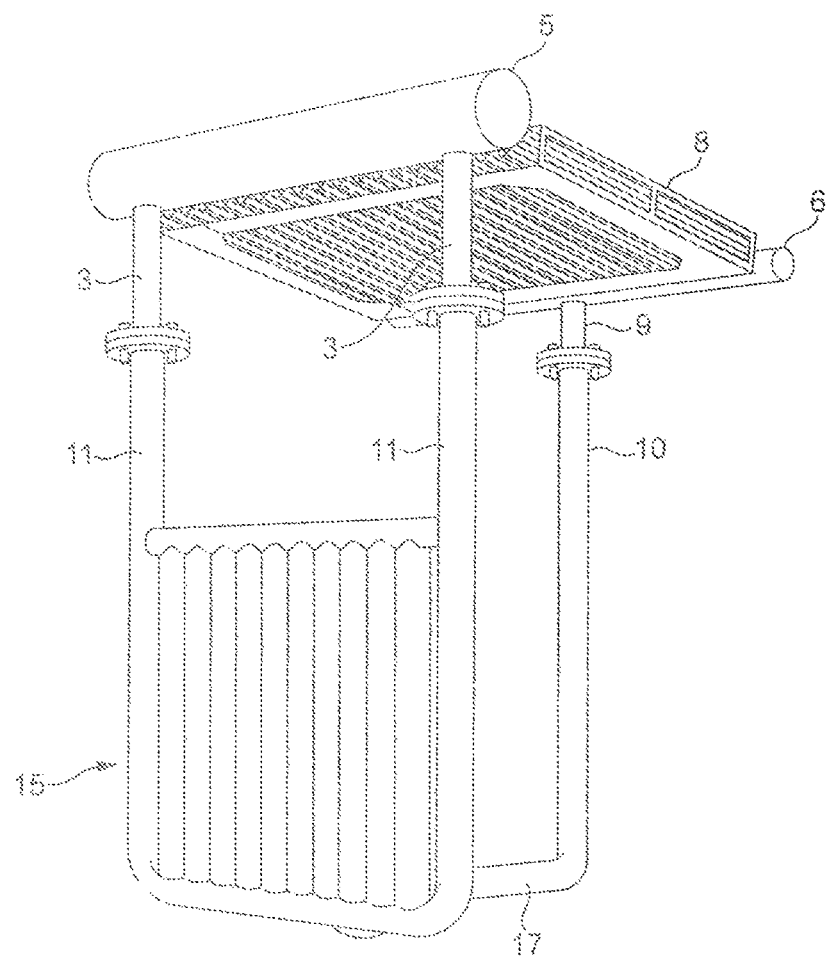
FIG. 10 illustrates a view of the fluid circulation circuit comprising an internal heat exchanger and an external heat exchanger of the passive water cooler unit illustrated in any of FIGS. 1 to 9. This corresponds to the view illustrated in FIG. 9 in which the water tank assembly is removed to reveal the internal heat exchanger.

FIG. 8 provides a further view of the passive water cooler unit upon the emergency shower 40, in which the thermal insulation panels 70 having removed from the walls of the housing assembly so as to reveal further framework of the housing assembly and the water tank 30 enclosed within it. FIG. 9 shows a modified version of FIG. 8 in which all of the housing assembly and the underlying emergency shower unit are removed to reveal solely the water tank 30 and the heat exchanger (internal and external, complete). Finally, FIG. 10 shows a modified version of FIG. 9 in which the water tank 30 is removed to reveal the full and complete heat exchanger system in isolation.

Figure 11:
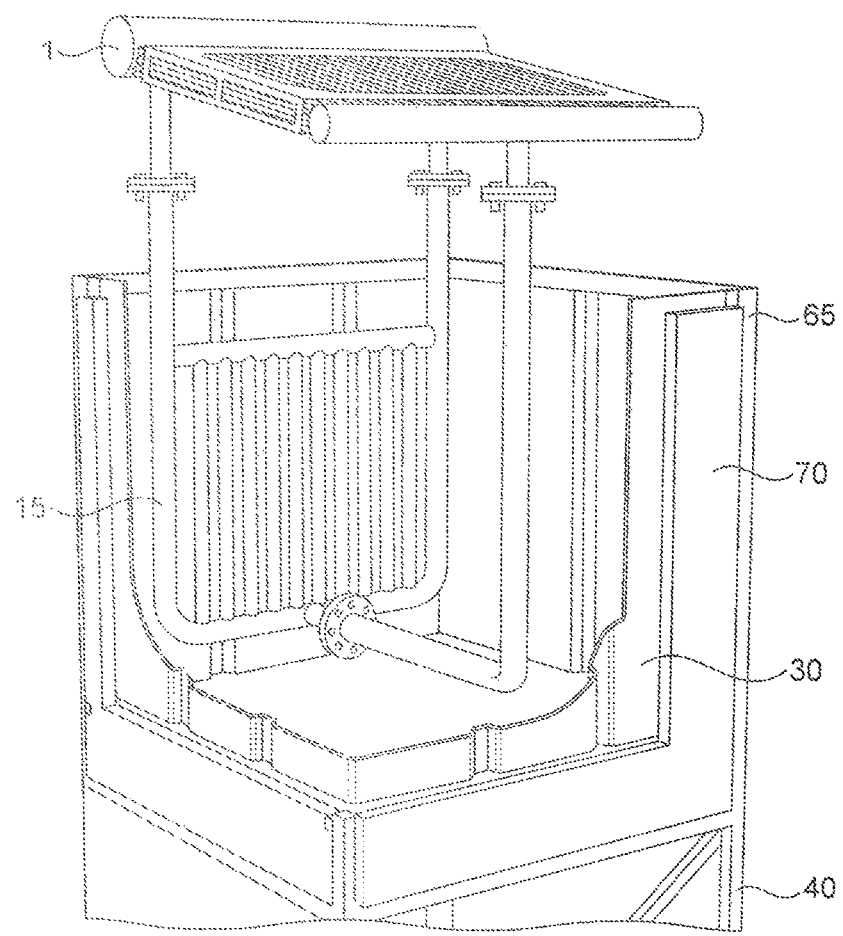
FIG. 11 illustrates a cut-away view of the emergency shower unit illustrated in FIG. 6, in which the water tank contains a volume of water within which the internal heat exchanger is disposed.

FIG. 11 shows a schematic cut-away view of the emergency shower unit 40 (upper parts only) including the partially stripped-down view shown in FIG. 7 in which external panelling is removed from the housing assembly of the passive water cooler to reveal insulation panelling (with cut-away), water tank 30 (with cut-way) containing water within which is immersed the internal heat exchanger. The roof assembly 12 of the passive water cooler unit is omitted from FIG. 11, only for clarity purposes. This figure illustrates how, in this example, the water tank 30 comprises a water reservoir part and a thermal insulating assembly. The thermal insulating assembly surrounds, encloses and envelopes the water reservoir part of the water tank 30 when the roof part 12 (not shown) of the thermal insulating assembly is in place. The thermal insulating assembly comprises, in effect, six panels 70 (or enclosure 'sides') of thermal insulating material.

Figure 12A:
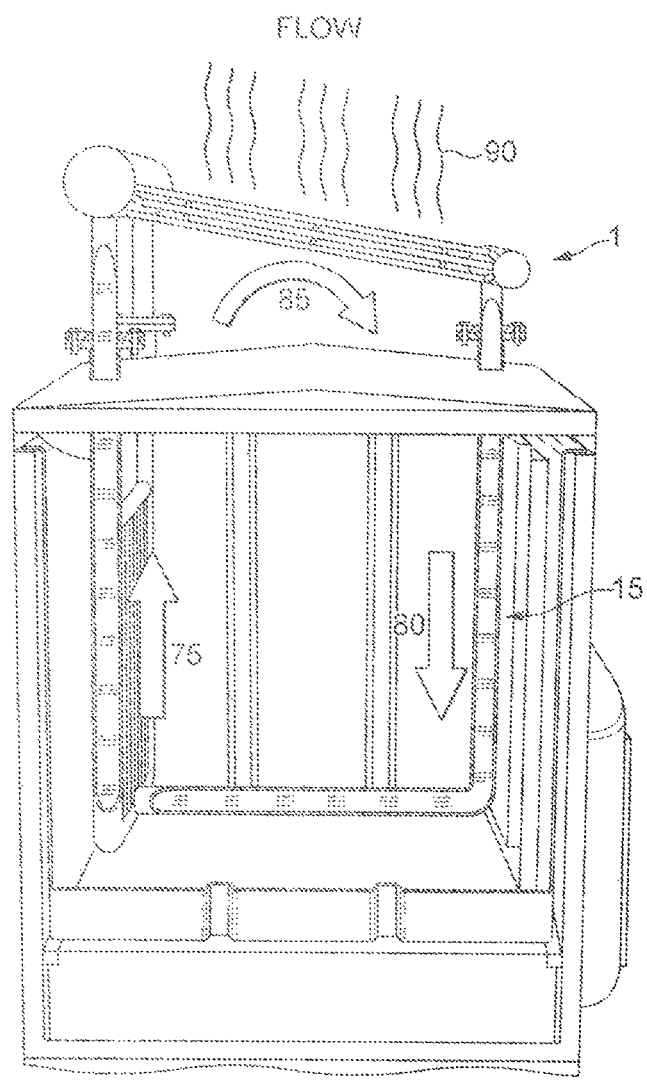
FIG. 12A illustrates a cut-away side view of the emergency shower unit illustrated in FIG. 6 in which the water tank contains a volume of water, and in which a cut-away view of the fluid circulation circuit comprising the internal heat exchanger and the external heat exchanger reveals coolant fluid flowing by convection between the two heat exchangers to transfer heat between them.
Figure 12B:
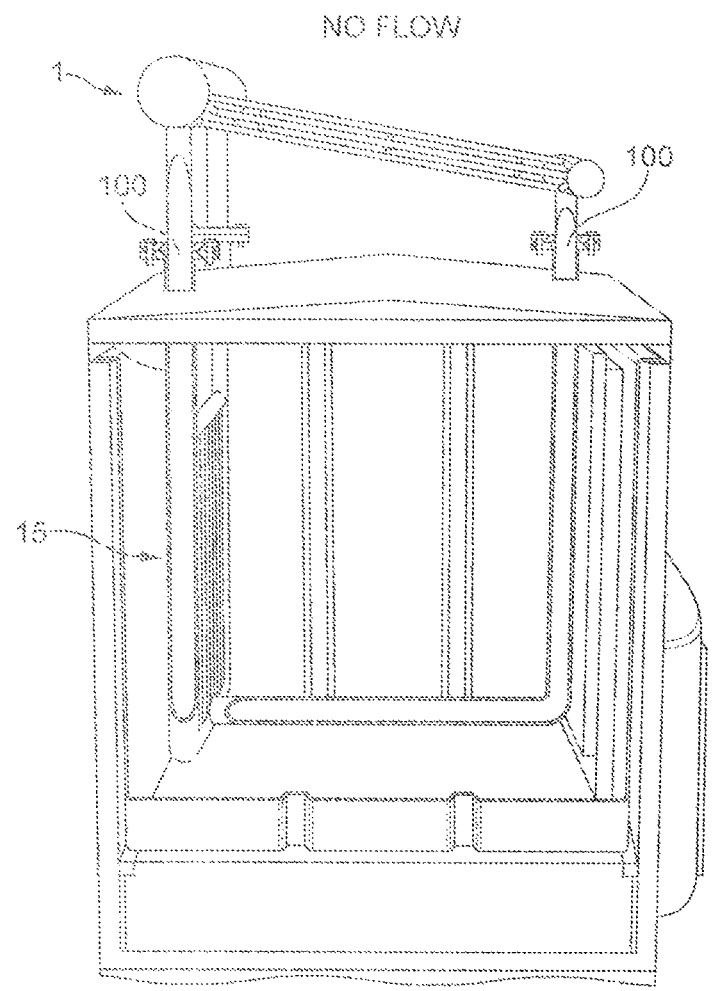
FIG. 12B illustrate a cut-a ways side view of the emergency shower unit illustrated in FIG. 12A, in which the coolant fluid has formed a thermocline between the external heat exchanger and the internal heat exchanger which prevents the coolant fluid flowing by convection between the two heat exchangers.

FIGS. 12A and 12B show additional cut-away views correspond to FIG. 11, and seen from the side of the emergency shower unit, in which cut-away views of the coolant fluid circulation circuit are provided to reveal the flow of coolant fluid under relatively cold night-time conditions (FIG. 12A) and under relatively hot, subsequent daytime conditions (FIG. 12B). In particular, with reference to FIG. 12A, during cold night-time conditions, heat 90 within the coolant fluid of the fluid circulation circuit is radiated away into the ambient night-time environment from the radiator grille assembly of the external heat exchanger 1. This causes coolant fluid within the group assembly of the external heat exchanger to cool and become denser. This denser fluid sinks downwardly 85 along the inclined path of the coolant fluid flow tubes of the external heat exchanger grille and enters 80 the internal heat exchanger 15 via the coolant fluid down-flow pipe within the water tank. Relatively warm water contained within the water tank subsequently transfers heat to the coolant fluid within the internal heat exchanger, especially in the grille assembly regions of the internal heat exchanger formed by the coolant fluid bifurcation pipes. Here, the coolant fluid is heated and rises upwardly 75 along the coolant fluid up-flow pipes so as to exit the water tank and re-enter the external heat exchanger at the coolant fluid inlet end thereof, to collect in the coolant collection chamber 5. At this point, the heated coolant fluid is once more present within the cold ambient night-time environment and heat from the heated coolant fluid radiates away from the external heat exchanger, comes more dense in the process and the coolant fluid flow circulation path repeats. This continues while the ambient environment is colder than the water contained within the water tank.

Conversely, with reference to FIG. 12B, during warmer (e.g. hot) daytime conditions, the external heat exchanger is radiatively heated by the warmer ambient environment and causes coolant fluid within it to become similarly heated. Provided that the ambient temperature exceeds the temperature of water within the water tank, heated coolant fluid within the external heat exchanger is always less dense than cooler coolant fluid within the internal heat exchanger. Loss of heat from the external heat exchanger is not possible and the coolant fluid circulation which is possible during the night-time is prevented during the day-time. Stratification of the coolant fluid within the heat exchanger pipework causes the formation of a thermocline 100 at parts of the coolant fluid circulation pipework between external and internal parts thereof. This thermocline reinforces stratification of coolant fluid flow. This is highly beneficial as it prevents the warm external coolant fluid from entering the internal heat exchanger and thereby prevents any heat exchange between the warm external ambient environment and the water contained within the water tank.

The provision of thermal insulation surrounding the water tank substantially prevents or greatly inhibits any transfer of heat from the warmer ambient environment, during the daytime, into the inner enclosure of the housing assembly thereby shielding the water tank and the water within it from the warmer (potentially hot) ambient daytime temperatures. This control of temperature transfer has been found to be exceptionally effective in desert environments where the difference between daytime temperatures and night-time temperatures is extreme. The invention provides a very effective passive water cooling system requiring no external power for the purposes of extracting heat from thermally enclosed/encapsulated body of water.

Figure 13:
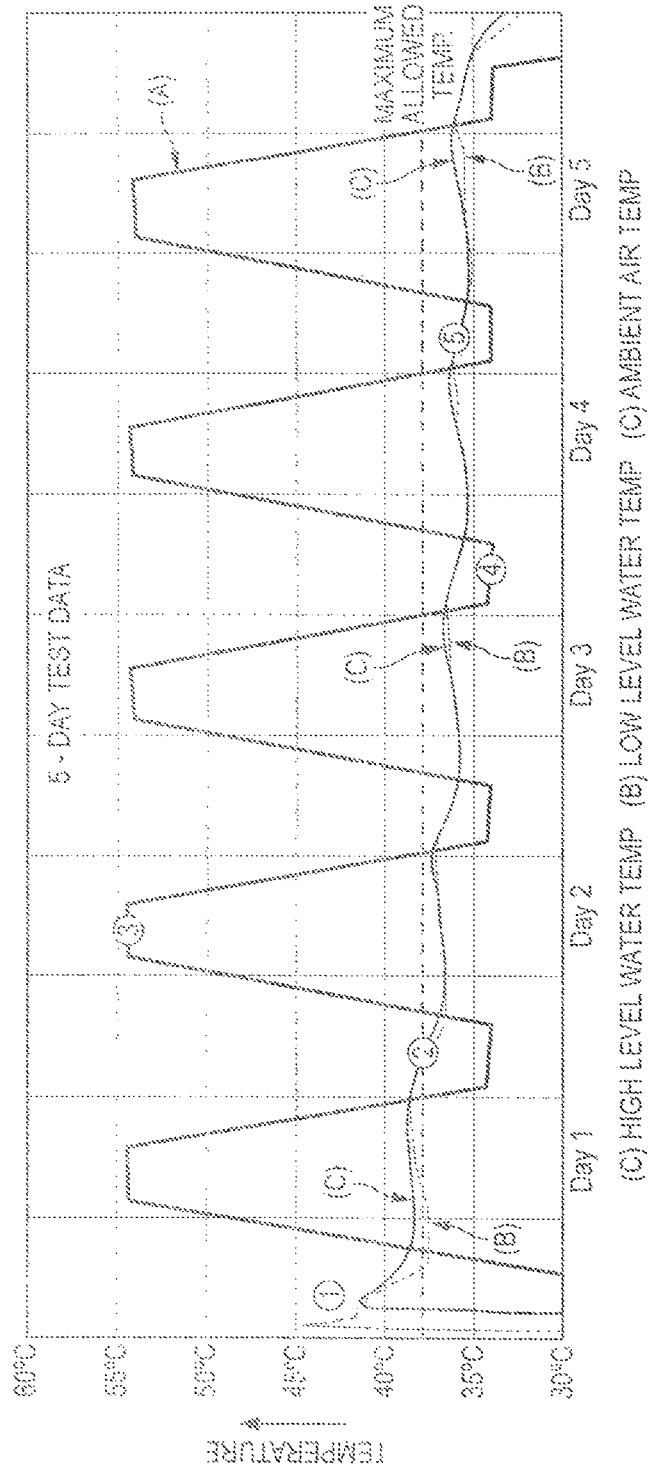
FIG. 13 graphically illustrates the variation in temperature of the volume of water contained within the water tank of the passive water cooler unit illustrated in any of FIGS. 1 to 12B, over a five-day period.
Figure 14:
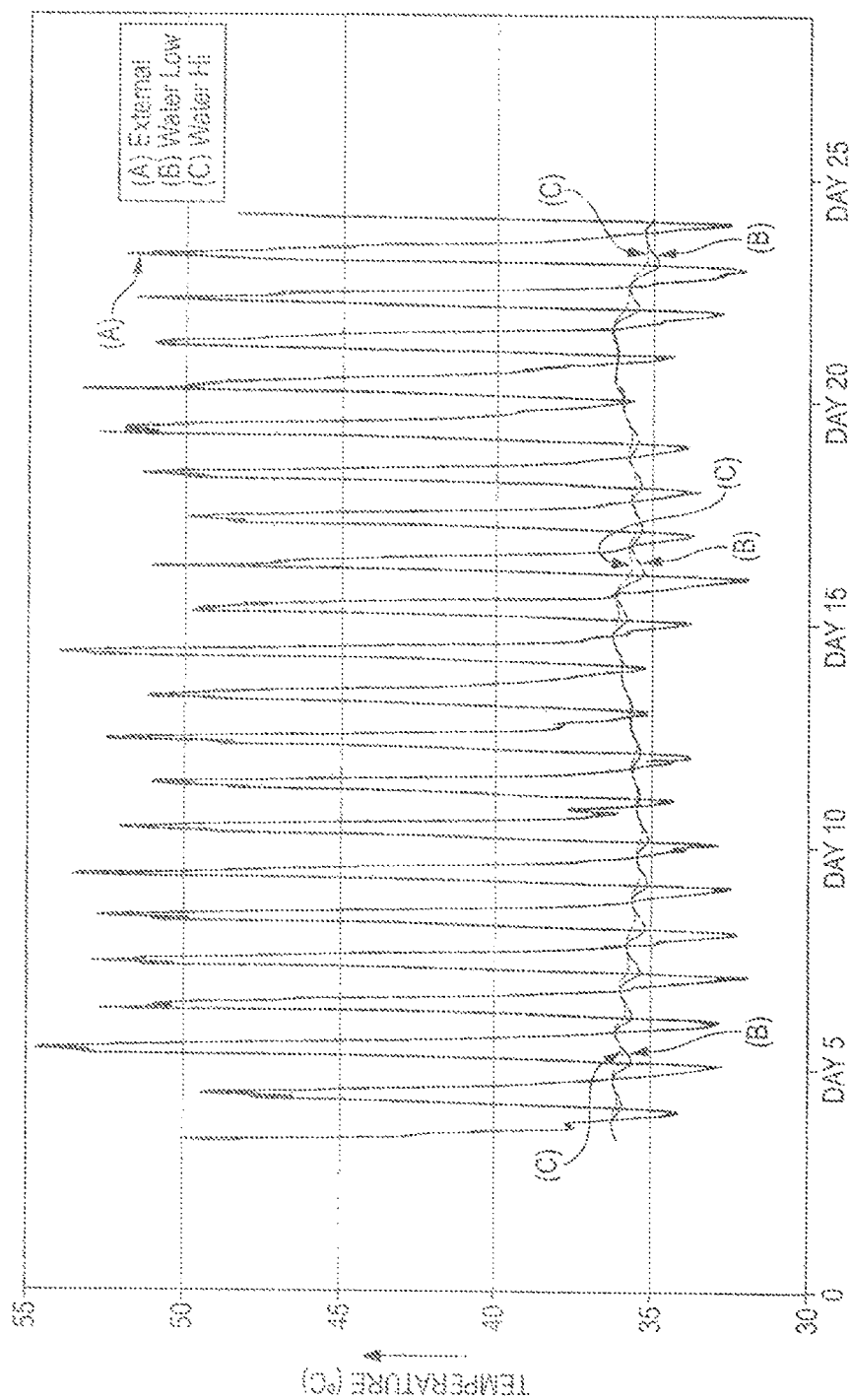
FIG. 14 a graphically illustrates the variation in temperature of the volume of water contained within the water tank of the passive water cooler of any of FIGS. 1 to 12 the, over a 20 day period.

FIG. 13 shows a graph of the temperature of water inside the water tank of a passive water cooler apparatus described above, over a period of five days, together with the temperature of the outside environment within which the external heat exchanger of the passive water cooler was disposed. The environment in question was a temperature-controlled test chamber in which the ambient temperature (A) was strictly controlled to vary over five successive 24-hour repeating cycles as shown. Thus, daytime air temperatures rose to about 55° C. (such as graph point 3), and night-time air temperatures fell to about 34° C. (such as graph point 4). During this period water contained within the water tank of the passive water cooler apparatus began with the temperature of about 42° C. (graph point 1), but after one full day fell to a temperature below 38° C. (graph point 2). The temperature of the water within the water tank continued to follow an overall downward trend (e.g. towards graph point 5) and generally stabilised at a temperature significantly below 38° C. (e.g. about 36° C.). FIG. 14 shows a graph of the temperature of water inside the water tank of a passive water cooler apparatus described above, over a period of 25 days, together with the temperature of the outside environment within which the external heat exchanger of the passive water cooler was disposed. The environment in question was a confidential outside test location in the United Arab Emirates (UAE) exposed to direct sunlight during the day-time, and the open night sky at night-time, during the month of July. The ambient temperature varies over 25 successive day/night cycles as shown. The development of water temperature within the water tank extends over a period of about 20 of those 25 days. FIGS. 13 and 14 show the water temperatures for water within the water tank at a high point ("water high") within the water tank close to the top of the water tank, and also at a low point ("water low") in water tank close to the bottom of the water tank.

These results illustrate that the invention provides a power-free, passive, system for cooling a body of water in environments having sufficiently large temperature differences between warmer daytime temperatures and cooler night-time temperatures (e.g. deserts, tropical regions etc.).

Emergency eyewash and/or shower equipment is often required to meet regulatory requirements and compliance standards. A common standard is ANSI/ISEA Z358.1, "Emergency Eyewash and Shower Equipment." This standard is a widely accepted guideline for the proper operation of such emergency equipment, and it requires that the water temperature delivered by such emergency equipment should be 'tepid.' Tepid is defined to be between 16° C. and 38° C. FIGS. 13 and 14 show the water temperatures for water within the water tank according to the invention, that are 'tepid' both at a high point ("water high") within the water tank where water tends to have higher temperatures, and also at a low point ("water low") in water tank where the water tends to be cooler. Accordingly, the invention is able to provide 'tepid' water within the requirements of industry standards in ambient environments where average night-time ambient temperatures do not exceed 38 degrees. The water may preferably be 'potable' in accordance with the ANSI/ISEA Z358.1 standard.

The invention claimed is:

1. A passive water cooler comprising:
   a water tank arranged for containing a volume of water;
   an internal heat exchanger disposed within the water tank for contact with said volume of water;
   an external heat exchanger disposed outside the water tank in thermal communication with the internal heat exchanger;
   wherein:
   the external heat exchanger and the internal heat exchanger are arranged in fluid communication in a mutual fluid circulation circuit configured to contain coolant fluid flowable therein by convection to provide said thermal communication for transferring heat;
   the tank comprises thermally insulating material for thermally insulating said volume of water from the environment within which the external heat exchanger resides;
   the external heat exchanger is arranged to be positioned higher than the internal heat exchanger to permit formation of a thermocline within said coolant fluid between the external heat exchanger and the internal heat exchanger.

2. A passive water cooler according to claim 1 in which said fluid circulation circuit is a closed circuit.

3. A passive water cooler according to claim 1 in which the external heat exchanger comprises a fluid inlet for receiving an upward convection flow of said coolant fluid from the internal heat exchanger, and a fluid outlet for outputting a downward convection flow of said coolant fluid to the internal heat exchanger, wherein the external heat exchanger is arranged within said fluid circulation circuit to define a fluid flow path which is inclined downwardly from the fluid inlet to the fluid outlet thereof.

4. A passive water cooler according to claim 3 comprising coolant fluid flow conduits containing said coolant fluid and defining said fluid circulation circuit.

5. A passive water cooler according to claim 4 in which the external heat exchanger comprises a fluid reception chamber uppermost within the fluid circulation circuit for receiving said upward convection flow of said coolant fluid from said fluid inlet, and one or more of said fluid flow conduits extending downwardly from the fluid reception chamber to said fluid outlet each thereby defining said inclined fluid flow path.

6. A passive water cooler according to claim 4 in which the coolant fluid flow conduits are formed from thermally conductive material.

7. A passive water cooler according to claim 4 in which the proportion of the volume of the water tank occupied by said coolant fluid flow conduit(s) is less than the proportion of the volume thereof available for containing said volume of water.

8. A passive water cooler according to claim 4 in which said fluid circulation circuit comprises fluid flow conduits disposed to extend upwardly within the water tank in a direction from the internal heat exchanger towards the external heat exchanger.

9. A passive water cooler according to claim 4 in which said fluid circulation circuit comprises fluid flow conduits that extend through at least 50% of the internal height of the water tank.

10. A passive water cooler according to claim 1 in which the internal heat exchanger comprises a plurality of fluid flow conduits arranged within the fluid circulation circuit to bifurcate a coolant fluid flow path(s) from the external heat exchanger and to subsequently recombine the bifurcated coolant fluid flow path(s) for output to the external heat exchanger.

11. A passive water cooler according to claim 10 wherein the plurality of fluid flow conduits of the internal heat exchanger are disposed to extend upwardly within the water tank in a direction from the internal heat exchanger towards the external heat exchanger.

12. A passive water cooler according to claim 1 in which said coolant fluid comprises water.

13. A passive water cooler according to claim 1 comprising coolant fluid flow conduits containing said coolant fluid and defining said fluid circulation circuit.

14. A passive water cooler according to claim 13 in which the coolant fluid flow conduits are formed from thermally conductive material.

15. A passive water cooler according to claim 13 in which the proportion of the volume of the water tank occupied by said coolant fluid flow conduit(s) is less than the proportion of the volume thereof available for containing said volume of water.

16. A passive water cooler according to claim 13 in which said fluid circulation circuit comprises fluid flow conduits disposed to extend upwardly within the water tank in a direction from the internal heat exchanger towards the external heat exchanger.

17. A passive water cooler according to claim 13 in which said fluid circulation circuit comprises fluid flow conduits that extend through at least 50% of the internal height of the water tank.

* * * * *